US010397603B1

(12) United States Patent
Li et al.

(10) Patent No.: US 10,397,603 B1
(45) Date of Patent: Aug. 27, 2019

(54) METHOD AND APPARATUS FOR VIDEO CODING

(71) Applicant: TENCENT AMERICA LLC, Palo Alto, CA (US)

(72) Inventors: Guichun Li, Milpitas, CA (US); Xiaozhong Xu, State College, PA (US); Shan Liu, San Jose, CA (US); Xiang Li, San Diego, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/218,187

(22) Filed: Dec. 12, 2018

Related U.S. Application Data

(60) Provisional application No. 62/668,779, filed on May 8, 2018.

(51) Int. Cl.
  *H04N 19/52* (2014.01)
  *H04N 19/176* (2014.01)
  *H04N 19/105* (2014.01)

(52) U.S. Cl.
  CPC .......... *H04N 19/52* (2014.11); *H04N 19/105* (2014.11); *H04N 19/176* (2014.11)

(58) Field of Classification Search
  CPC .... H04N 19/52; H04N 19/503; H04N 19/593; H04N 19/105; H04N 19/176
  See application file for complete search history.

(56) References Cited

U.S. PATENT DOCUMENTS

| 8,526,495 | B2 | 9/2013 | Liu et al. | |
|---|---|---|---|---|
| 9,049,452 | B2 | 6/2015 | Liu et al. | |
| 9,510,012 | B2 | 11/2016 | Liu et al. | |
| 9,813,726 | B2 | 11/2017 | Liu et al. | |
| 9,961,358 | B2 | 5/2018 | Liu et al. | |
| 2014/0133570 | A1* | 5/2014 | Lee | H04N 19/593 375/240.16 |

(Continued)

OTHER PUBLICATIONS

Sullivan et al., "Overview of the high efficiency video coding (HEVC) standard," IEEE Transactions on Circuits and Systems for Video Technology, vol. 22, No. 12, pp. 1649-1668, Dec. 2012.

(Continued)

*Primary Examiner* — Tracy Y. Li
(74) *Attorney, Agent, or Firm* — Oblon, McClelland, Maier & Neustadt, L.L.P.

(57) ABSTRACT

In some embodiments, an apparatus for video coding includes processing circuitry. The processing circuitry is configured to receive a current block of a current picture. The current block has a width and a height. The processing circuitry is further configured to determine whether a first temporal motion candidate at one of a right edge and bottom edge of a co-located block of the current block can be used according to the width and/or the height of the current block in the current picture, and in response to determining that the first temporal motion candidate can be used, check the availability of the first temporal motion candidate at the one of the right edge and bottom edge of the co-located block of the current block. The processing circuitry is further configured to add the first temporal motion candidate to a motion candidate list when the first temporal motion candidate is available.

20 Claims, 14 Drawing Sheets

(56) References Cited

U.S. PATENT DOCUMENTS

2014/0341284 A1* 11/2014 Kim .............. H04N 19/52
375/240.12
2018/0227593 A1* 8/2018 Chen ............. H04N 19/52

OTHER PUBLICATIONS

Yang et al, "Description of Core Experiment 4 (CE4): Inter prediction and motion vector coding", ISO/IEC JTC1/SC29/WG11 JVET-J1024, Apr. 2018.

Xu, et al, "Non-CE2: Intra BC merge mode with default candidates", ISO/IEC JTC1/SC29/WG11 JCTVC-S0123, Oct. 2014.

Xu, et al, "CE2: Test 3.2—Intra BC merge mode with default candidates", ISO/IEC JTC1/SC29/WG11 JCTVC-T0073, Feb. 2015.

Liu et al., "Nonlinear motion-compensated interpolation for low-bit-rate video" in Applications of Digital Image Processing XXIII, vol. 4115, p. 203-214, Dec. 2000.

Liu et al., "MCI-embedded motion-compensated prediction for quality enhancement of frame interpolation" in Multimedia Systems and Applications III, vol. 4209, p. 251-262, Mar. 2001.

Liu et al., "Video Coding via Adaptive Selection of Generalized Motion Prediction Modes for B Frames," in the Picture Coding Symposium 2001, Seoul, Korea, Apr. 25-27, 2001.

\* cited by examiner

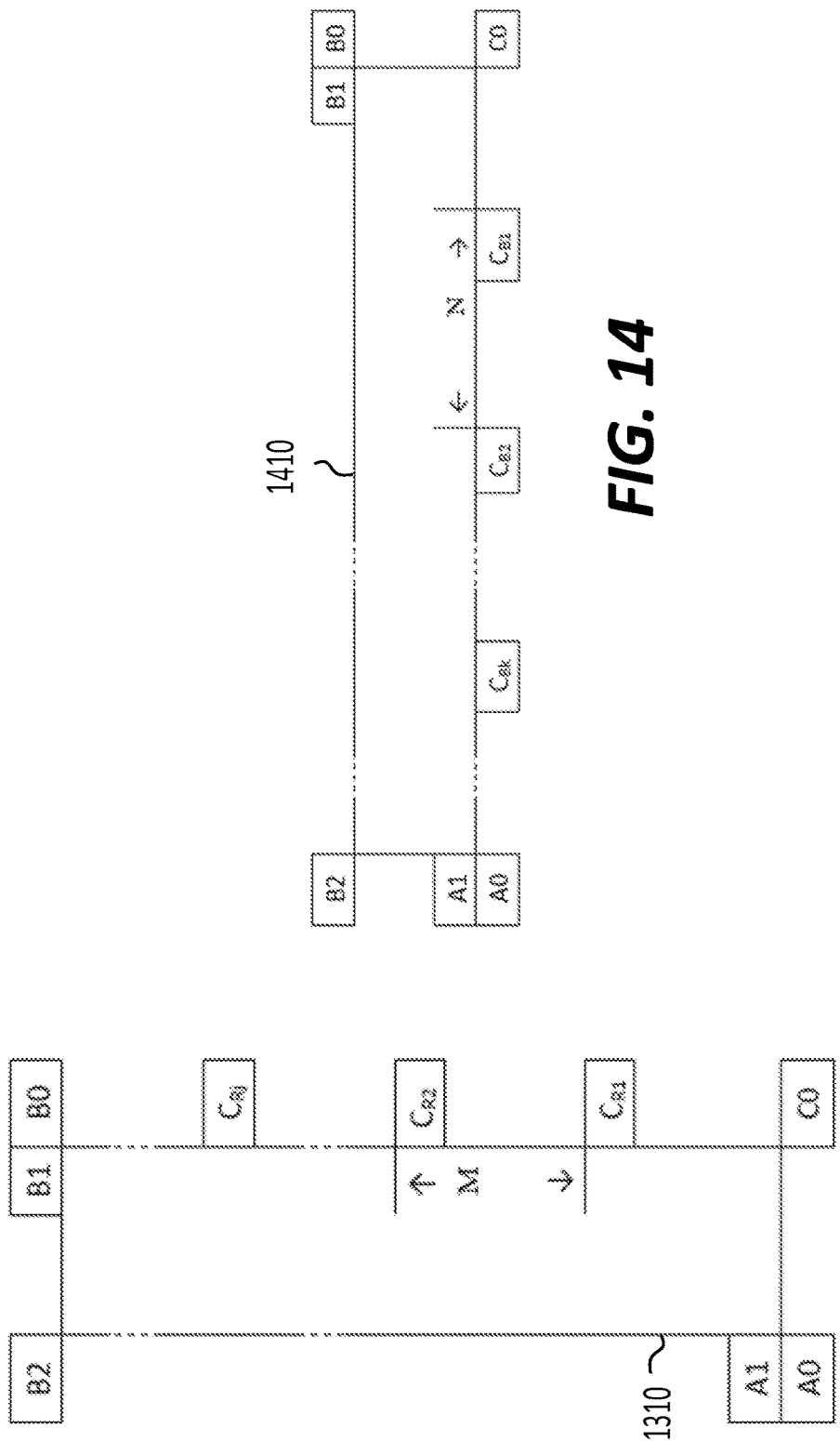

METHOD AND APPARATUS FOR VIDEO CODING

INCORPORATION BY REFERENCE

This present disclosure claims the benefit of priority to U.S. Provisional Application No. 62/668,779, "Methods for Merge and Motion Vector Prediction Temporal Candidate List for Inter-Picture Prediction" filed on May 8, 2018, which is incorporated by reference herein in its entirety.

TECHNICAL FIELD

The present disclosure relates to video coding techniques.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video coding. In some examples, an apparatus includes receiving circuitry and processing circuitry. The processing circuitry is configured to receive a current block of a current picture. The current block has a width and a height. The processing circuitry is further configured to determine whether a first temporal motion candidate at one of a right edge and bottom edge of a co-located block of the current block can be used according to the width and/or the height of the current block in the current picture, and in response to determining that the first temporal motion candidate can be used, check the availability of the first temporal motion candidate at the one of the right edge and bottom edge of the co-located block of the current block. The processing circuitry is further configured to add the first temporal motion candidate to a motion candidate list when the first temporal motion candidate is available.

In an embodiment, the candidate list is one of a merge candidate list and a motion vector predictor candidate list. In an embodiment, the first temporal motion candidate is at one of the middle of the right edge and the middle of the bottom edge of the co-located block.

In an embodiment, the processing circuitry is further configured to, when the height of the current block is larger than a first threshold, check the availability of the first temporal motion candidate at the middle of the right edge of the co-located block. The first temporal motion candidate can be located at one of locations above and below a middle point of the right edge of the co-located block.

In an embodiment, the processing circuitry is further configured to, when the width of the current block is larger than a second threshold, check the availability of the first temporal motion candidate at the middle of the bottom edge of the co-located block. The first temporal motion candidate can be located at one of the left and right side of a middle point of the bottom edge of the co-located block.

In an embodiment, the processing circuitry is further configured to check availabilities of temporal motion candidates at the right edge of the co-located block. Starting from the bottom-right corner of the co-located block, every M samples from the right edge of the co-located block has one of the temporal motion candidates.

In an embodiment, the processing circuitry is further configured to check availabilities of temporal motion candidates at the bottom edge of the co-located block. Starting from the bottom-right corner of the co-located block, every N samples from the bottom edge of the co-located block has one of the temporal motion candidates.

Aspects of the disclosure also provide a non-transitory computer-readable medium storing instructions which when executed by a computer for video decoding cause the computer to perform the methods for video coding.

BRIEF DESCRIPTION OF THE DRAWINGS

Further features, the nature, and various advantages of the disclosed subject matter will be more apparent from the following detailed description and the accompanying drawings in which:

FIGS. 13-15 show examples of multiple temporal merge candidates along a bottom edge or a right edge of a co-located block of a current block when a respective bottom edge or right edge of the current block is larger than a threshold.

DETAILED DESCRIPTION OF EMBODIMENTS

I. Video Coding Encoder and Decoder

Figure 1:
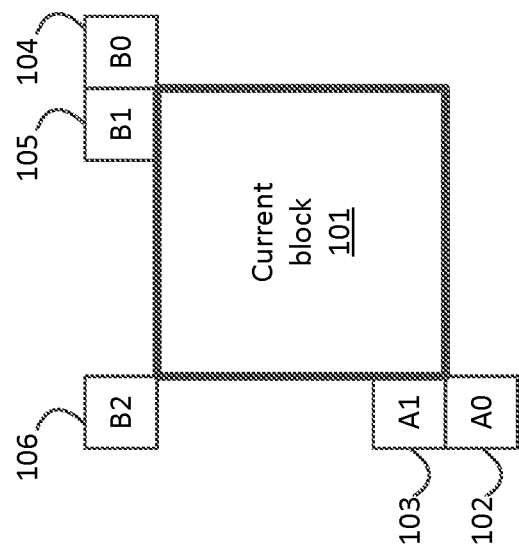
FIG. 1 is a schematic illustration of a current block and its surrounding spatial merge candidates in one example.
Figure 2:
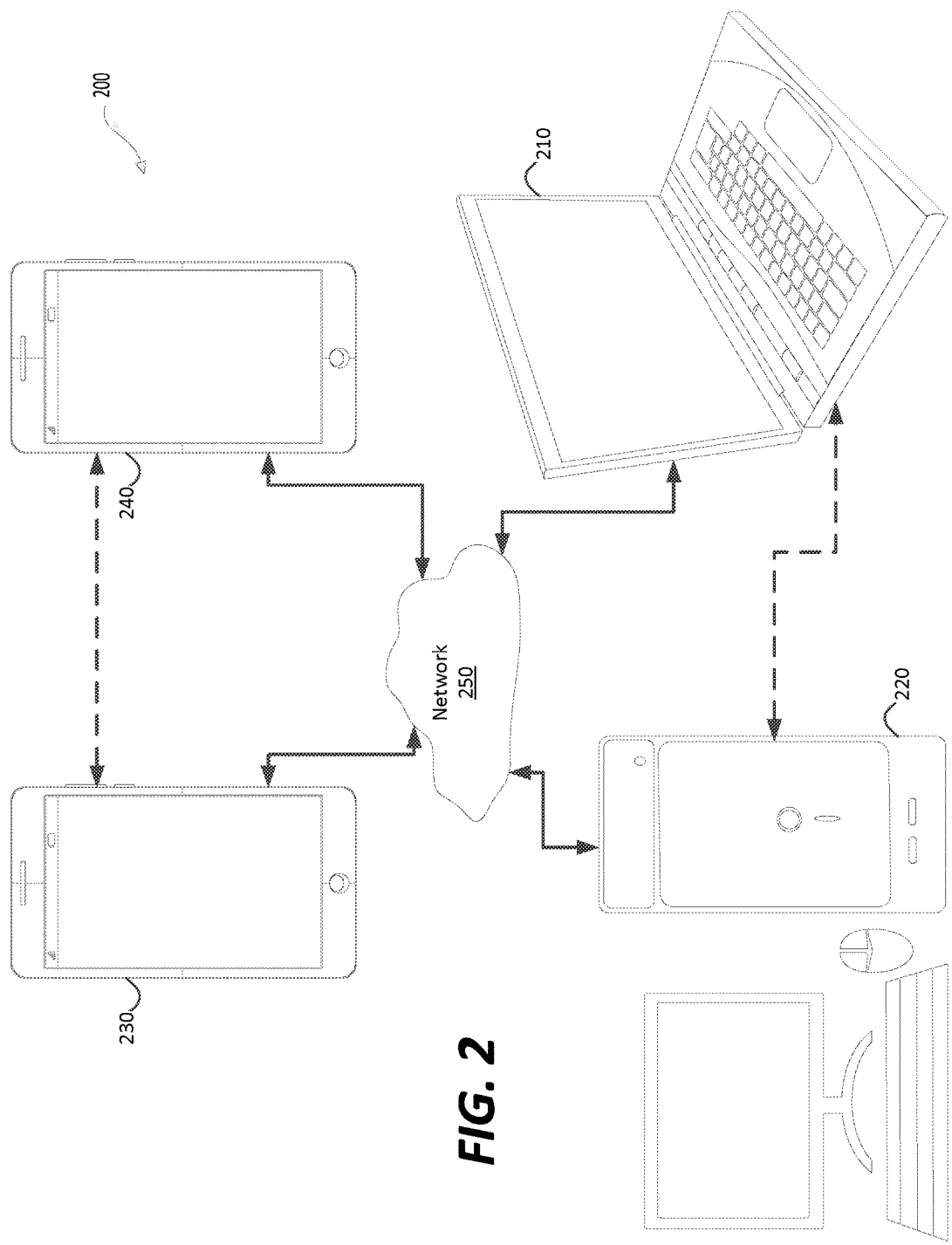
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
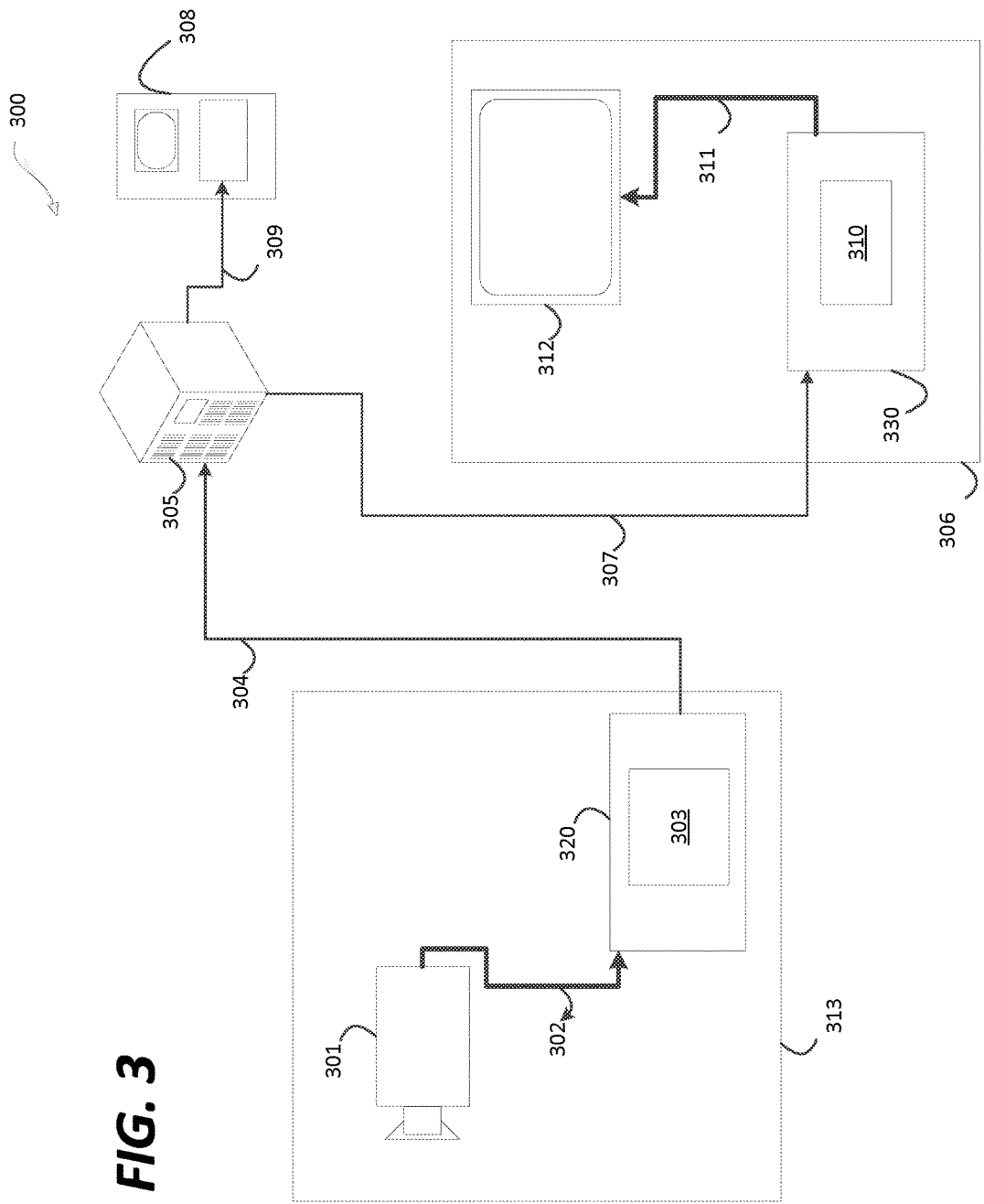
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
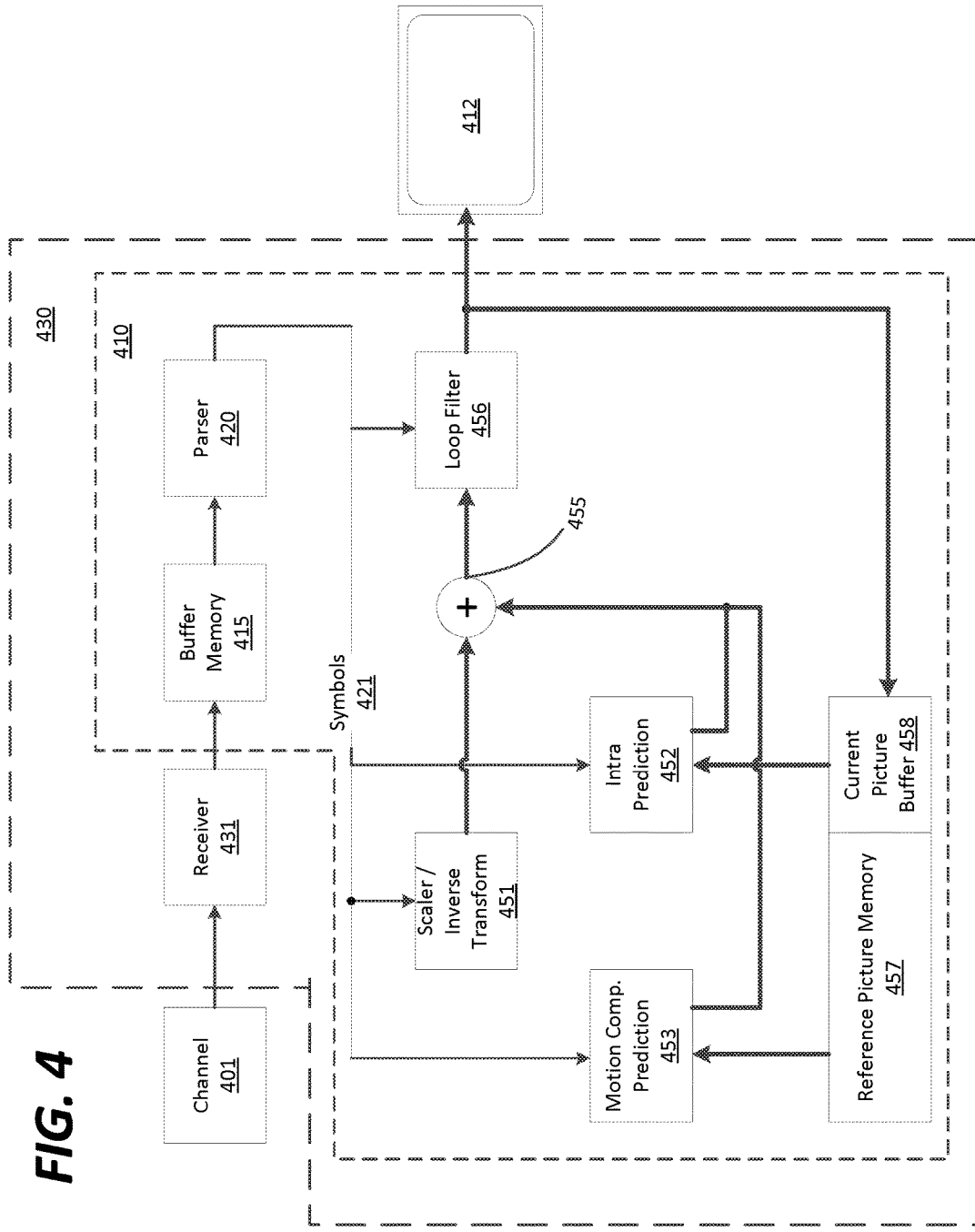
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
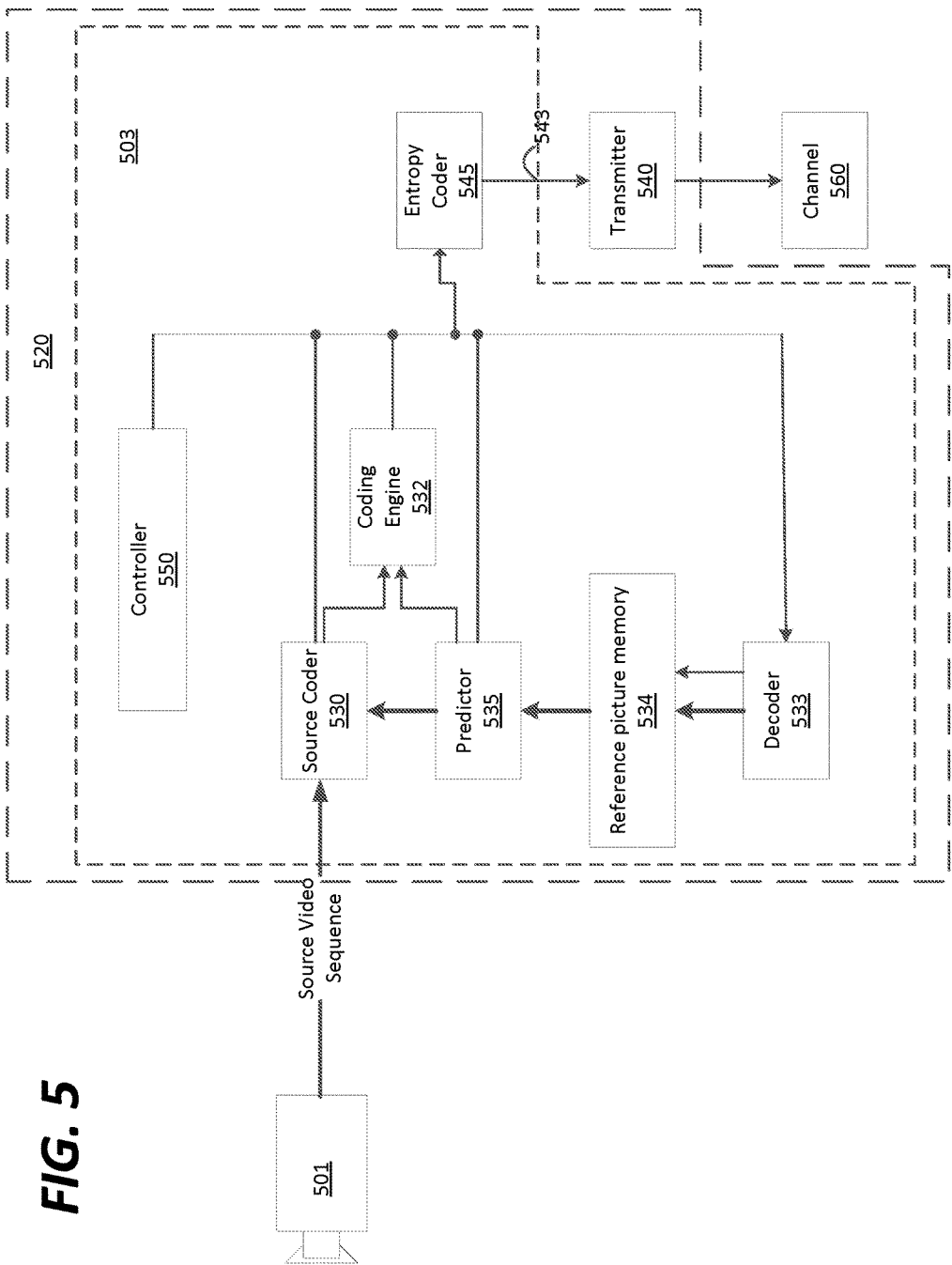
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501)(that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 6:
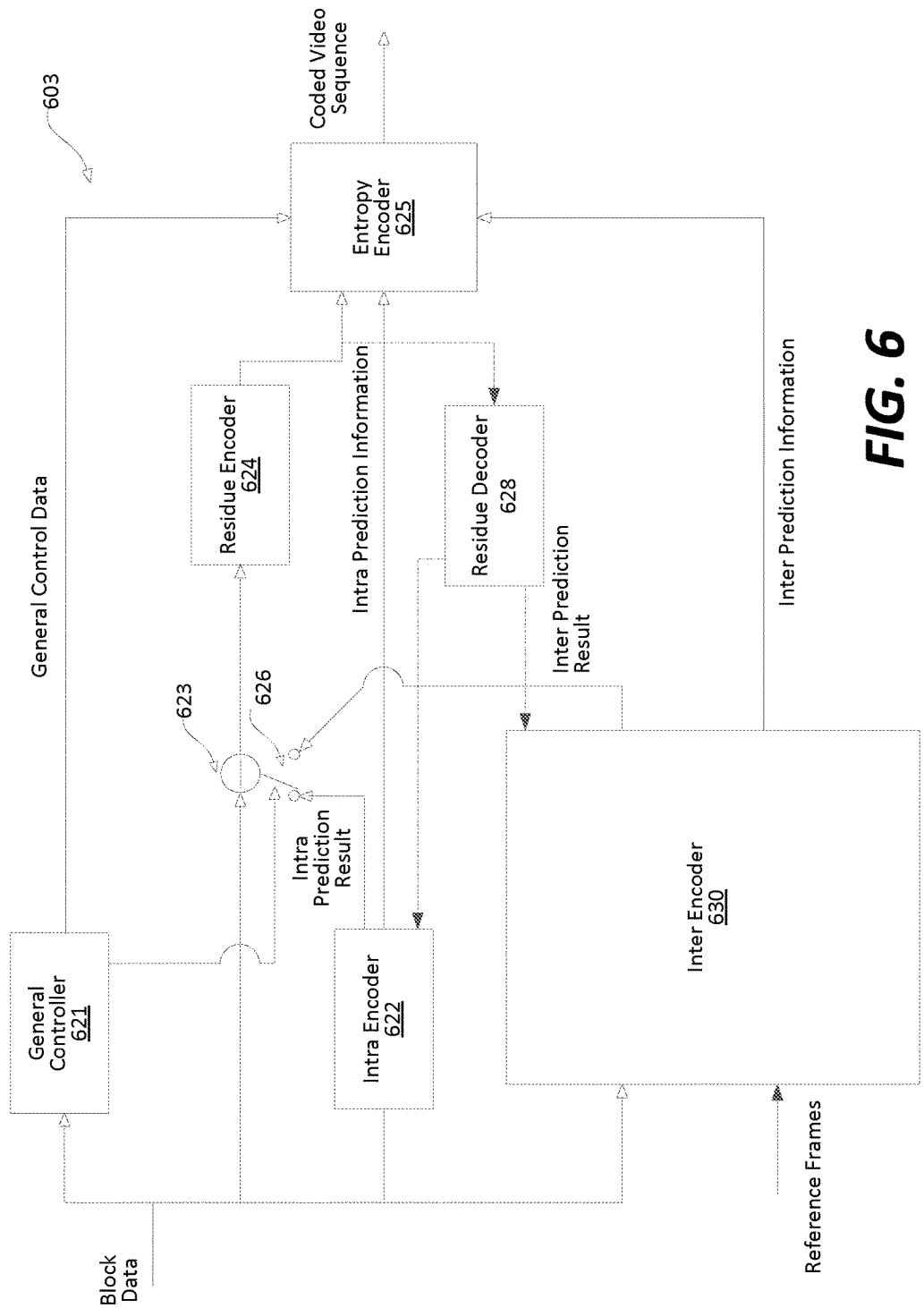
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion (RD) optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621) and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a time domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
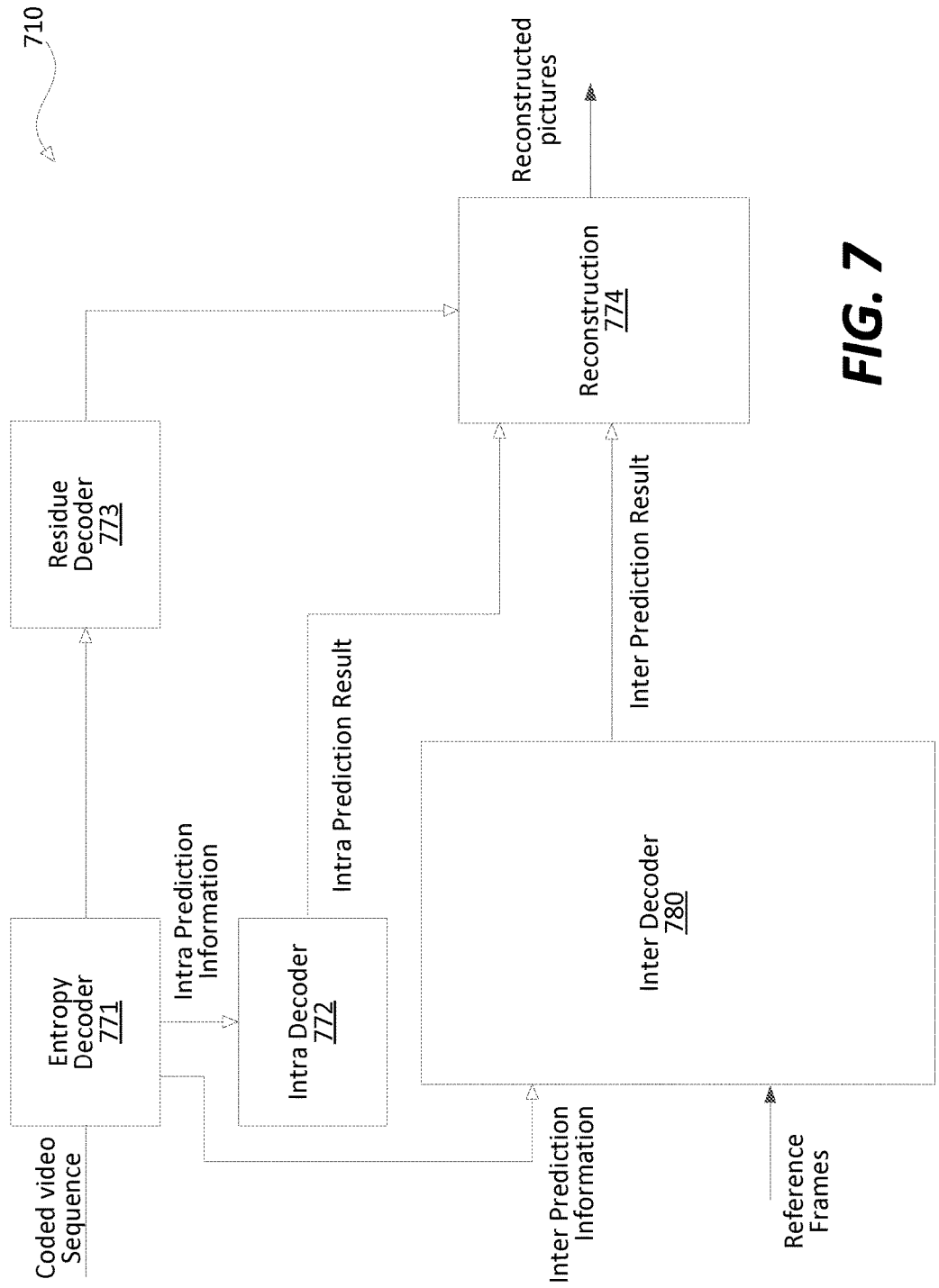
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter QP), and that information may be provided by the entropy decoder (771) (datapath not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Motion Information Coding Techniques

II. 1 Merge Mode

A picture can be partitioned into blocks, for example, using a tree structure based partition scheme. The resulting blocks can then be processed with different processing modes, such as an intra prediction mode, an inter prediction mode (e.g., merge mode, skip mode, advanced motion vector prediction (AVMP) mode), and the like. When a currently processed block, referred to as a current block, is processed with a merge mode, a neighbor block can be selected from a spatial or temporal neighborhood of the current block. The current block can be merged with the selected neighbor block by sharing a same set of motion data (or referred to as motion information) from the selected neighbor block. This merge mode operation can be performed over a group of neighbor blocks, such that a region of neighbor blocks can be merged together and share a same set of motion data. During transmission from an encoder to a decoder, only an index indicating the motion data of the selected neighbor block is transmitted for the current block, instead of transmission of a whole set of motion data. In this way, an amount of data (bits) that are used for transmission of motion information can be reduced, and coding efficiency can be improved.

In the above example, the neighbor block, which provides the motion data, can be selected from a set of candidate positions predefined with respect to the current block. For example, the candidate positions can include spatial candidate positions and temporal candidate positions. Each spatial candidate position is associated with a spatial neighbor block neighboring the current block. Each temporal candidate position is associated with a temporal neighbor block located in a previously coded picture. Neighbor blocks overlapping the candidate positions (referred to as candidate blocks) are a subset of spatial or temporal neighbor blocks of the current block. In this way, the candidate blocks can be evaluated for selection of a to-be-merged block instead of the whole set of neighbor blocks.

Figure 8:
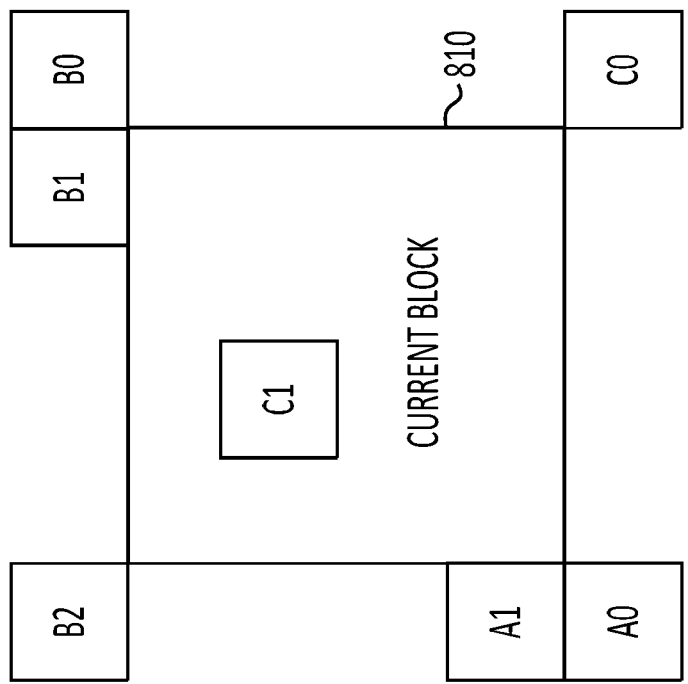
FIG. 8 shows exemplary spatial and temporal motion candidate positions for construction of a merge candidate list or motion vector predictor candidate list.

FIG. 8 shows an example of candidate positions. From those candidate positions, a set of merge candidates can be selected to construct a merge candidate list. For example, the candidate positions as defined in FIG. 8 can be used in the HEVC standard. As shown, a current block (810) is to be processed with merge mode. A set of candidate positions {A1, B1, B0, A0, B2, C0, C1} are defined for the merge mode processing. Specifically, candidate positions {A1, B1, B0, A0, B2} are spatial candidate positions that represent positions of candidate blocks that are in the same picture as the current block (810). In contrast, candidate positions {C0, C1} are temporal candidate positions that represent positions of candidate blocks that are in a previously coded picture and neighbor or overlap a co-located block of the current block (810). As shown, the candidate position C1 can be located near a center of the current block (810).

A candidate position can be represented by a block of samples or a sample in different examples. In FIG. 8, each candidate position is represented by a block of samples, for example, having a size of 4×4 samples. A size of such a block corresponding to a candidate position can be equal to or smaller than a minimum allowable size of PBs (e.g., 4×4 samples) defined for a tree-based partitioning scheme used for generating the current block (810). Under such a configuration, a block corresponding to a candidate position can always be covered within a single neighbor PB. In an alternative example, a sample position (e.g., a bottom-right sample within the block A1, or a top-right sample within the block A0) may be used to represent a candidate position. Such a sample is referred to as a representative sample, while such a position is referred to as a representative position.

In one example, based on the candidate positions {A1, B1, B0, A0, B2, C0, C1} defined in FIG. 8, a merge mode process can be performed to select merge candidates from the candidate positions {A1, B1, B0, A0, B2, C0, C1} to construct a candidate list. The candidate list can have a predefined maximum number of merge candidates, Cm. Each merge candidate in the candidate list can include a set of motion data that can be used for motion-compensated prediction.

The merge candidates can be listed in the candidate list according to a certain order. For example, depending on how the merge candidate is derived, different merge candidates may have different probabilities of being selected. The merge candidates having higher probabilities of being selected are positioned in front of the merge candidates having lower probabilities of being selected. Based on such an order, each merge candidate is associated with an index (referred to as a merge index). In one embodiment, a merge candidate having a higher probability of being selected will have a smaller index value which means fewer bits are needed for coding the respective index.

In one example, the motion data of a merge candidate can include horizontal and vertical motion vector displacement values of one or two motion vectors, one or two reference picture indexes associated with the one or two motion vectors, and optionally an identification of which reference picture list is associated with each index.

In an example, according to a predefined order, a first number of merge candidates, Ca, is derived from the spatial candidate positions according to the order {A1, B1, B0, A0, B2}, and a second number of merge candidates, Cb=Cm−Ca, is derived from the temporal candidate positions according to the order {C0, C1}. The numerals A1, B1, B0, A0, B2, C0, C1 for representing candidate positions can also be used to refer to merge candidates. For example, a merge candidate obtained from candidate position A1 is referred to as the merge candidate A1.

In some scenarios, a merge candidate at a candidate position may be unavailable. For example, a candidate block at a candidate position can be intra-predicted, outside of a slice or tile including the current block (810), or not in a same coding tree block (CTB) row as the current block (810). In some scenarios, a merge candidate at a candidate position may be redundant. For example, one neighbor block of the current block (810) can overlap two candidate positions. The redundant merge candidate can be removed from the candidate list (by performing a pruning process). When a total number of available merge candidates (with redundant candidates being removed) in the candidate list is smaller than the maximum number of merge candidates Cm, additional merge candidates can be generated (for example, according to a preconfigured rule) to fill the candidate list such that the candidate list can be maintained to have a fixed length. For example, additional merge candidates can include combined bi-predictive candidates and zero motion vector candidates.

After the candidate list is constructed, at an encoder, an evaluation process can be performed to select a merge candidate from the candidate list. For example, RD performance corresponding to each merge candidate can be calculated, and the one with the best RD performance can be selected. Accordingly, a merge index associated with the selected merge candidate can be determined for the current block (810) and signaled to a decoder.

At a decoder, the merge index of the current block (810) can be received. A similar candidate list construction process, as described above, can be performed to generate a candidate list that is the same as the candidate list generated at the encoder side. After the candidate list is constructed, a merge candidate can be selected from the candidate list based on the received merge index without performing any evaluations in some examples. Motion data of the selected merge candidate can be used for a subsequent motion-compensated prediction of the current block (810).

A skip mode is also introduced in some examples. For example, in the skip mode, a current block can be predicted using a merge mode as described above to determine a set of motion data, however, no residue is generated, and no transform coefficients are transmitted. A skip flag can be associated with the current block. The skip flag and a merge index indicating the related motion information of the current block can be signaled to a video decoder. For example, at the beginning of a CU in an inter-picture prediction slice, a skip flag can be signaled that implies the following: the CU only contains one PU (2N×2N); the merge mode is used to derive the motion data; and no residual data is present in the bitstream. At the decoder side, based on the skip flag, a prediction block can be determined based on the merge index for decoding a respective current block without adding residue information. Thus, various methods for video coding with merge mode disclosed herein can be utilized in combination with a skip mode.

II. 2 Advanced Motion Vector Prediction (AMVP) Mode

In some examples, motion information of a current block can be encoded with a predictive coding method. For example, instead of using a merge mode or skip mode, a motion vector of an inter-picture-predicted block can be differentially coded using a MV predictor. For example, similar to constructing a merge candidate list in the merge mode as described herein, a set of MV predictors can be selected from a set of MV predictor candidate positions to construct a list of MV predictor candidates. A MV predictor can then be selected among the multiple MV predictor candidates on the candidate list. A difference between the MV predictor and the actual motion vector and an index of the selected MV predictor candidate can be transmitted from an encoder side to a decoder side. Such a type of motion vector prediction processing is referred to as the AMVP mode in some examples.

In some examples, the candidate positions defined in FIG. 8 are used as MV predictor candidate positions for construction of a MV predictor candidate list. In one example, two spatial motion candidates are selected according to availabilities among the five spatial candidates in FIG. 8 to construct a MV predictor candidate list. The first spatial motion candidate can be selected from the set of left positions {A0, A1} and the second one can be selected from the set of above positions {B0, B1, B2} according to their availabilities, while following the search order indicated in the two sets. If no valid motion vector can be found from the two sets of positions, no candidates would be filled in the MV predictor list. A pruning operation may be performed to remove redundant candidates from the list. When the number of available spatial MV predictors is not equal to two (or is less than two), the temporal motion candidates at the set of positions {C0, C1} will be considered according to their availabilities and the searching order indicated in the set. Finally, a zero motion vector is included repeatedly until the number of MV predictor candidates is equal to two.

The current block and neighboring blocks in FIG. 8 can be a uni-directional or bi-directional block, and thus may be associated with one or two reference picture lists (L0 and L1). When the current block is a bi-directional block having two associated MVs, the above MV predictor candidate list construction process can be performed twice for each MV.

The MVs of the current block and a candidate block may be associated with different reference picture lists (L0 or L1) or different reference pictures (different reference picture indexes). When the reference picture index of a neighboring candidate block is not equal to that of the current block, a scaled version of the respective motion vector is used. For example, the respective neighboring MV is scaled according to the temporal distances between the current picture and the reference pictures indicated by the indexes of the neighboring block and the current block.

III. Extended Temporal Motion Candidates for Merge and Motion Vector Prediction

As described in the above merge mode and AMVP mode examples, the motion candidates included in a merge candidate list or a MV predictor candidate list can be selected or derived from the temporal and spatial motion candidates at the positions defined in the FIG. 8 example. However, for a block with a large size or a block with a long side, additional spatial and temporal motion candidates may be desired. As the number of the motion candidates at respective candidate positions increases, a better merge candidate or MV predictor can potentially be selected or derived compared with the FIG. 8 example, resulting in a better motion information coding efficiency and a higher picture quality.

III. 1 Temporal Motion Candidates in Merge Mode

III. 1.1 Additional Temporal Merge Candidates

Figure 9:
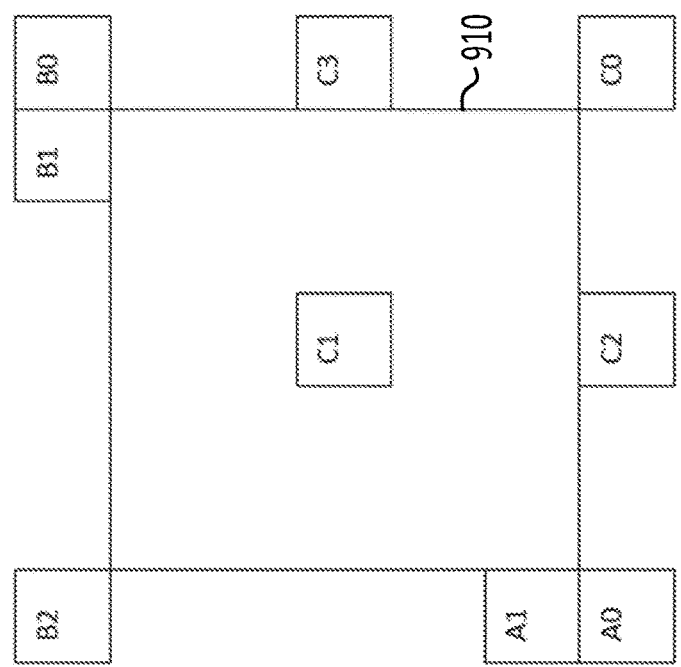
FIG. 9 shows an example of merge candidates that includes additional temporal motion candidates compared with FIG. 8 example.

FIG. 9 shows an example of merge candidates that include additional temporal motion candidates {C2, C3} compared with the FIG. 8 example. The merge candidates shown in FIG. 9 include a set of spatial candidates {A0, A1, B0, B1, B2}, and a set of temporal candidates {C0, C1, C2, C3}. The spatial candidates come from blocks that are in the same current picture as a current block (910), while the temporal candidates come from blocks that neighbor or overlap a co-located block of the current block in a reference picture of the current picture. For example, the reference picture can be a picture closest to the current picture in the time domain (e.g., the picture having a reference index of 0), or the reference picture can be a picture corresponding to a reference index indicated by a syntax element in a bitstream.

The candidate positions {A0, A1, B0, B1, B2, C0, C1} can be located at positions similar to that defined in the FIG. 8 example. The temporal candidate positions {C2, C3} can each be located around the middle of the respective bottom or right edge of the current block (910). Accordingly, the position C2 is referred to as a bottom-middle temporal candidate position C2, and the respective motion information of a temporal neighbor block overlapping the position C2 is referred to as a bottom-middle temporal candidate C2. Similarly, the position C3 is referred to as a middle-right temporal candidate position C3, and the respective motion information of a temporal neighbor block overlapping the position C3 is referred to as a middle-right temporal candidate C3.

For example, the bottom-middle position C2 can represent a position at a sample that is adjacent to or overlaps a middle point of the bottom edge of the block (910). For example, the bottom edge has a length of 16 samples indexed from 0 to 15, the 7th and 8th sample are adjacent to the middle point between the 7th and 8th samples. The bottom-middle position C2 can correspond to the position of the 7th or 8th sample in different examples. Similarly, the middle-right position C3 can represent a position at a sample that is adjacent to or overlaps a middle point of the right edge. For example, the middle right position C3 may be above or below the middle point in different examples.

In addition, in various examples, whether the additional temporal candidate positions C2 and/or C3 are checked or not for constructing a merge candidate list depends on a size (e.g., side lengths) of the current block (910). For example, if the size of the current block (910) is too small compared with a threshold(s), the temporal candidate positions C2 and/or C3 will not be included in the set of temporal candidate positions for deriving the temporal merge candidate(s) on the candidate list.

In one example, when the width of the current block (910) is larger than or equal to a threshold (e.g., X samples), the bottom-middle candidate C2 can be checked for constructing a merge candidate list. In one example, when the height of the current block (910) is larger than or equal to a threshold (e.g., Y samples), the middle-right candidate C3 can be checked.

Further, similar to the FIG. 8 example, when checking the temporal candidate position of one of C2 or C3, the respective temporal candidate may be unavailable. For example, a collocated block at the position of the one of C2 or C3 may be intra-coded, or may be outside of a current CTU row, or a current slice or tile. When the temporal candidate at the position of the one of C2 or C3 is not available, the temporal candidate of the one of C2 or C3 is not used.

Figure 10:
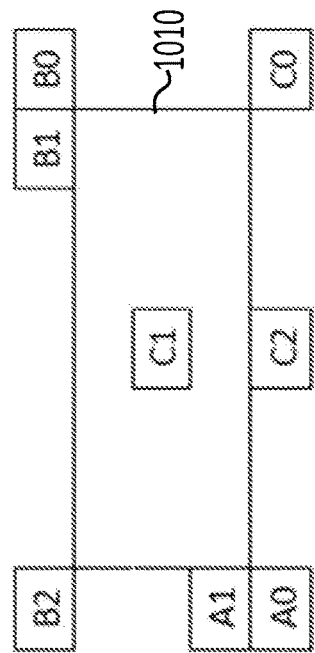
FIGS. 10-12 show examples of motion candidate positions that include additional temporal motion candidates.

FIG. 10 shows an example of motion candidate positions adjacent to a current block (1010). In the FIG. 10 example, when a width of the current block (1010) is larger than or equal to a first threshold (e.g., X samples), and the height of the current block (1010) is smaller than a second threshold (e.g., Y samples), the bottom-middle temporal candidate C2 can be checked for constructing a merge candidate list and the right-middle temporal candidate C3 is not eligible to be checked.

Figure 11:
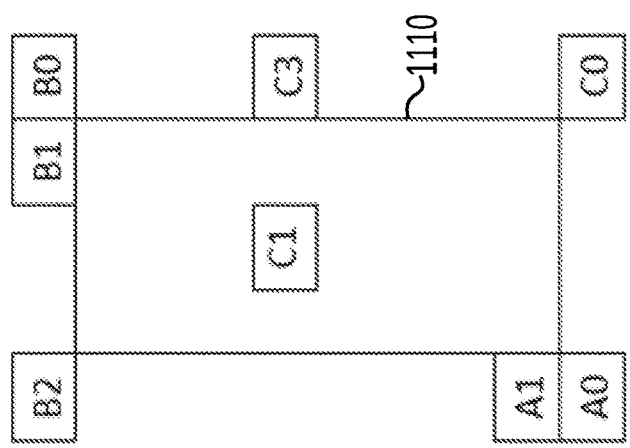

FIG. 11 shows an example of motion candidate positions adjacent to a current block (1110). In the FIG. 11 example, when a height of the current block (1110) is larger than or equal to a first threshold (e.g., Y samples), and the width of the current block (1110) is smaller than a second threshold (e.g., X samples), the middle-right temporal candidate C3 can be checked for constructing a merge candidate list and the bottom-middle temporal candidate C2 is not eligible to be checked.

Figure 12:
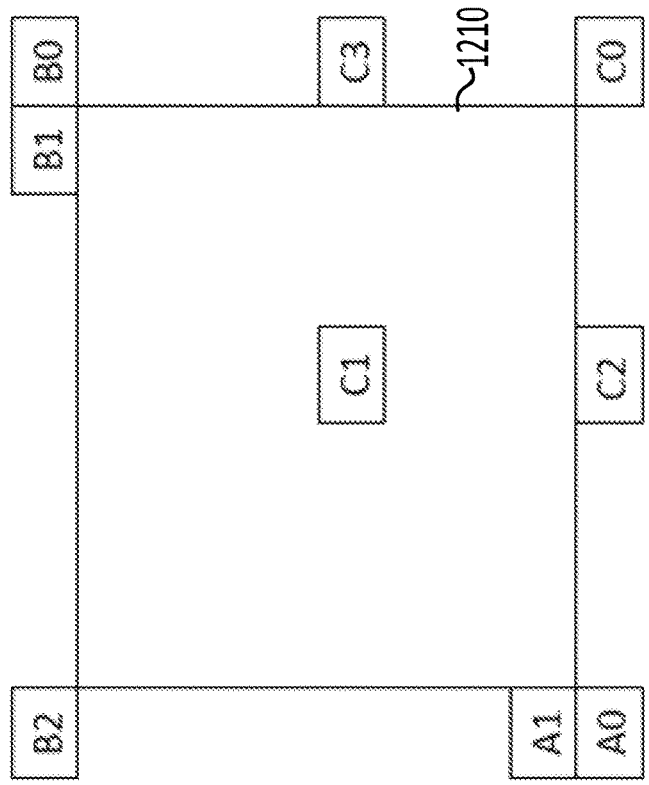

FIG. 12 shows an example of motion candidate positions adjacent to a current block (1210). In the FIG. 12 example, when a height of the current block (1210) is larger than or equal to a first threshold (e.g., Y samples), and the width of the current block (1210) is larger than or equal to a second threshold (e.g., X samples), both the bottom-middle and the middle-right temporal candidates C2 and C3 can be checked for constructing a merge candidate list.

III. 1.2 Preference Order with Additional Temporal Merge Candidates

As described in the merge mode examples with reference to FIG. 8, in a merge candidate list, available spatial candidates are arranged ahead of an available temporal candidate followed by generated merge candidates, and zero motion vectors. When adding a temporal candidate to the merge candidate list, the candidate C0 has a higher priority than the candidate C1. For example, if the co-located block at position C0 is not available, is intra coded, or is outside of the current CTU, position C1 is used. Otherwise, position C0 is used in the derivation of the temporal candidate. In contrast, when the additional temporal bottom-middle and middle-right candidates C2 and C3 are introduced, various preference orders for adding one or more temporal motion candidates to a merge candidate list may be utilized in various examples.

In an example, before checking candidate C1, availabilities of candidates C2, C3, and C0 are first checked. For example, when C2, C3, and C0 are all available, the priority order of adding those candidates to a merge candidate list can be one of the following:
{C2, C3, C0};
{C3, C2, C0};
{C0, C2, C3};
{C0, C3, C2};
{C2, C0, C3}; or
{C3, C0, C2}.

For example, for a merge candidate list allowed to include a maximum of N temporal candidates, N can be 1, 2, or 3. When the order {C3, C0, C2} is used, the first N candidates of {C3, C0, C2} can be selected in the order to be added to the candidate list.

In an example, when candidate C0 is not available, but candidates C2, C3 and C1 are available, the priority order for adding those candidates to a merge candidate list can be one of the following:
{C2, C3, C1};
{C3, C2, C1};
{C1, C2, C3};
{C1, C3, C2};
{C2, C1, C3}; or
{C3, C1, C2}.

In an example, when candidate C3 is not available, but candidates C2 and C0 are available, the priority order for adding those candidates to a merge candidate list can be one of the following:
{C2, C0}; or
{C0, C2}.

In an example, when candidate C2 is not available, but candidates C3 and C0 are available, the priority order for adding those candidates to a merge candidate list can be one of the following:
{C3, C0}; or
{C0, C3}.

In an example, when candidates C3 and C0 are not available, but candidates C2 and C1 are available, the priority order for adding those candidates to a merge candidate list can be one of the following:
{C2, C1}; or
{C1, C2}.

In an example, when candidates C2 and C0 are not available, but candidates C3 and C1 are available, the priority order for adding those candidates to a merge candidate list can be one of the following:
{C3, C1}; or
{C1, C3}.

In an example, when none of candidates C0, C2, and C3 are available, candidate C1 can be checked and used as a temporal merge candidate.

III. 1.3 Multiple Temporal Motion Candidates on a Co-Located Block Edge

Figure 15:
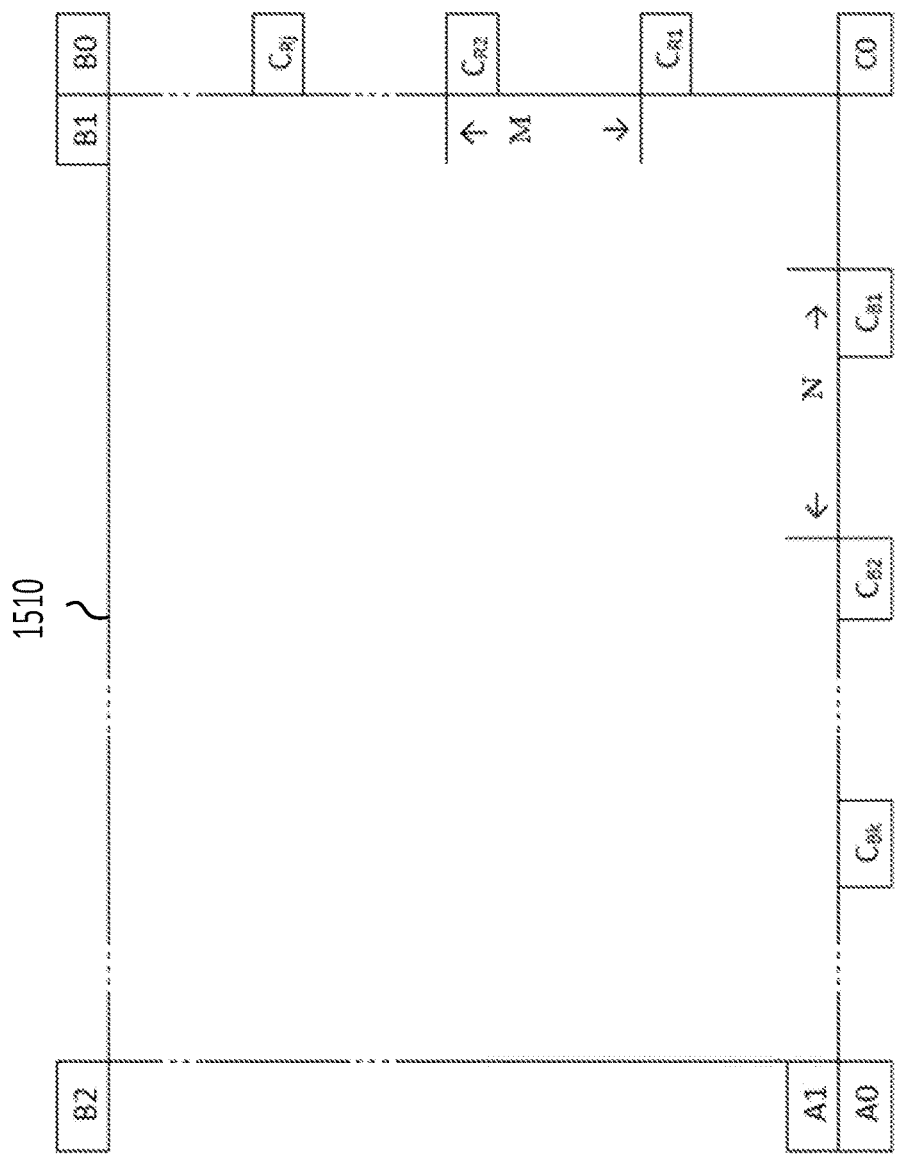

FIGS. 13-15 show examples of multiple temporal merge candidates along a bottom edge and/or a right edge of a co-located block of a current block based on whether each of a bottom edge and right edge of the current block is larger than a respective threshold. The temporal motion candidates at the bottom edge or right edge of the respective co-located block are added for constructing a merge candidate list compared with the FIG. 8 example.

In FIGS. 13-15, a coordinate system is utilized to describe a position of a sample. In the coordinate system, the sample at the top-left corner of the current block or co-located block has a coordinate of (0, 0). The sample at the bottom-right corner of the block has a coordinate of (W−1, H−1), where W denotes a width of the block, while H denotes a height of the block. In addition, Wmin and Hmin represent minimum allowable widths and heights of a block, respectively. In each of the FIGS. 13-15, spatial or temporal candidates {A0, A1, B0, B1, B2, C0, C1} are also shown in addition to the added temporal candidates at the bottom and/or right edge of the co-located block.

In the FIG. 13 example, the height of the current block (1310) is larger than or equal to a threshold (e.g., Y samples). Accordingly, multiple temporal merge candidates adjacent to the right edge of the co-located block of the current block (1310) can be added. Further, respective availabilities at those positions can be checked for constructing a merge candidate list. As shown, starting from the candidate position C0 at coordinate (W, H), there may be one new candidate for every M samples upwards along the right edge of the co-located block.

The j-th additional temporal candidate (counting from bottom to top) can be denoted as $C_{Rj}$, where $$j \in \left[1, \left\lfloor \frac{H}{M} \right\rfloor\right].$$

The respective representative positions of each candidate block $C_{Rj}$ (candidate position represented by each candidate block $C_{Rj}$) can correspond to a top-left sample of the respective candidate block. The coordinate of the representative position of each candidate block $C_R$ can thus be:

(W, H−M*j), corresponding to the position below a dividing point between two sets of M samples, or (W, H−M*j−H$_{min}$), corresponding to the position above a dividing point between two sets of M samples.

In the FIG. 14 example, the width of the current block (1410) is larger than or equal to a threshold (e.g., X samples). Accordingly, multiple temporal merge candidates adjacent to the bottom edge of the co-located block of the current block (1410) can be added and respective availabilities at those positions can be checked for constructing a merge candidate list. As shown, starting from the candidate position C0 at coordinate (W, H), there may be one new candidate for every N pixels leftwards along the bottom edge of the co-located block.

The k-th additional temporal candidate (counting from right to left) can be denoted as $C_{Bk}$, where $$k \in \left[1, \left\lfloor \frac{W}{N} \right\rfloor\right].$$

The respective representative positions of each candidate block $C_{Bk}$ can correspond to a top-left sample of the respective candidate block. The coordinate of the representative position of each candidate block $C_{Bk}$ can thus be:

(W−N*k, H), corresponding to the position at the right side of a dividing point between two sets of M samples, or (W, H−M*j−W$_{min}$), corresponding to the position at left side of a dividing point between two sets of M samples.

In the FIG. 15 example, the height of the current block (1510) is larger than or equal to a first threshold (e.g., Y samples), and the width of the current block (1510) is larger than or equal to a second threshold (e.g., X samples). Accordingly, multiple temporal merge candidates can be added at the right edge as well as bottom edge of the co-located block of the current block (1510) in a way similar to the FIG. 13 and FIG. 14 examples.

III. 1.4 Maximum Number of Merge Candidates and Pruning Operation

For a block with a large width or height (e.g., greater than predetermined width and/or height thresholds), additional spatial or temporal merge candidates may cause the total number of possible merge candidates to be larger than that of the FIG. 8 example. Accordingly, the size of the candidate list can be increased to take advantage of the increased merge candidate positions. For example, a maximum number of candidates in a merge candidate list can adapt to the number of available spatial and temporal merge candidates.

In one example, the number of total available merge candidates for a current block, including the spatial and temporal merge candidates, may be used as a maximum number of merge candidates on a candidate list.

In another example, the width and height of a current block may be used to determine a maximum number of merge candidates in a candidate list. When $C_{max}$ denotes the maximum number of candidates of a candidate list; W denotes the block width, and H denotes the block height, a maximum number of merge candidates of a candidate list can be derived from the block width and height according to the methods shown in the following two examples:

(i)

$$C_{max} = \frac{W}{a} + \frac{H}{b} + c,$$

where a, b, and c are integer values. In one example, a=8, b=8, c=1. Other values may be used for a, b, and c in different examples.

(ii) $C_{max} = a*\log_n W + b*\log_n H + c$, where a, b, c, and n are integer values. In one example, a=1, b=1, c=1, n=2. Other values may be used for a, b, c, and n in different examples.

During a process of constructing the merge candidate list, if a candidate at a position is unavailable (e.g., not coded in inter mode or otherwise not available), the candidate will not be added to the candidate list. If there is a candidate in the constructed list which has the same or similar motion information as the one derived, the derived one will not be added to the candidate list to avoid redundancy. In various examples, different definitions of similarity between motion information of a candidate A and a candidate B can be utilized.

In one example, for MVs of candidates A and B that point to the same reference picture, motion information is determined to be similar when an x or y component's absolute difference between the two MVs is smaller than or equal to a given threshold. For example, the threshold can be 1 integer pixel. In another example, for MVs of candidates A and B that point to different reference pictures, but after scaling to a common reference picture, motion information is determined to be similar when the x or y component's absolute difference between the two MVs is smaller than or equal to a given threshold. For example, the threshold can be 1 integer pixel.

III. 2 Temporal Motion Candidates in AMVP Mode

Similar to the addition of additional temporal merge candidates for constructing a merge candidate list as described above, in the AMVP mode, additional temporal MV predictor candidates can be added for constructing a MV predictor candidate list in some examples.

Similar to the examples described with reference to FIGS. 9-12, for AMVP mode processing, temporal MV predictor candidates can be selected or derived at the additional temporal motion candidate positions {C2, C3} in addition to the motion candidate positions {A0, A1, B0, B1, B2, C0, C1} as shown in FIGS. 9-12. Similarly, whether to check one of the candidate positions {C2, C3} can depend on a size of a current block. For example, when a width of the current block is larger than a first threshold, and/or a height of the current block is larger than a second threshold, the bottom-middle candidate C2 and/or the middle right candidate C3 can be checked to determine MV predictor candidates.

Similar to what is described in the section III. 1.2, when the additional temporal MV predictor candidates C2 and C3 are introduced, depending on availabilities of temporal candidates {C0, C1, C2 C3}, the various priority orders for adding one or more temporal motion candidates to a MV predictor candidate list, as described in the second III. 1.2, may be utilized in various examples.

In addition, similar to the examples described with reference to FIGS. 13-15, multiple temporal motion candidates $C_{Rj}$ along the right edge or multiple motion candidates $C_{Bk}$ along the bottom edge, as shown in FIGS. 13-15, can be checked for constructing a MV predictor candidate list in various examples.

Figure 16:
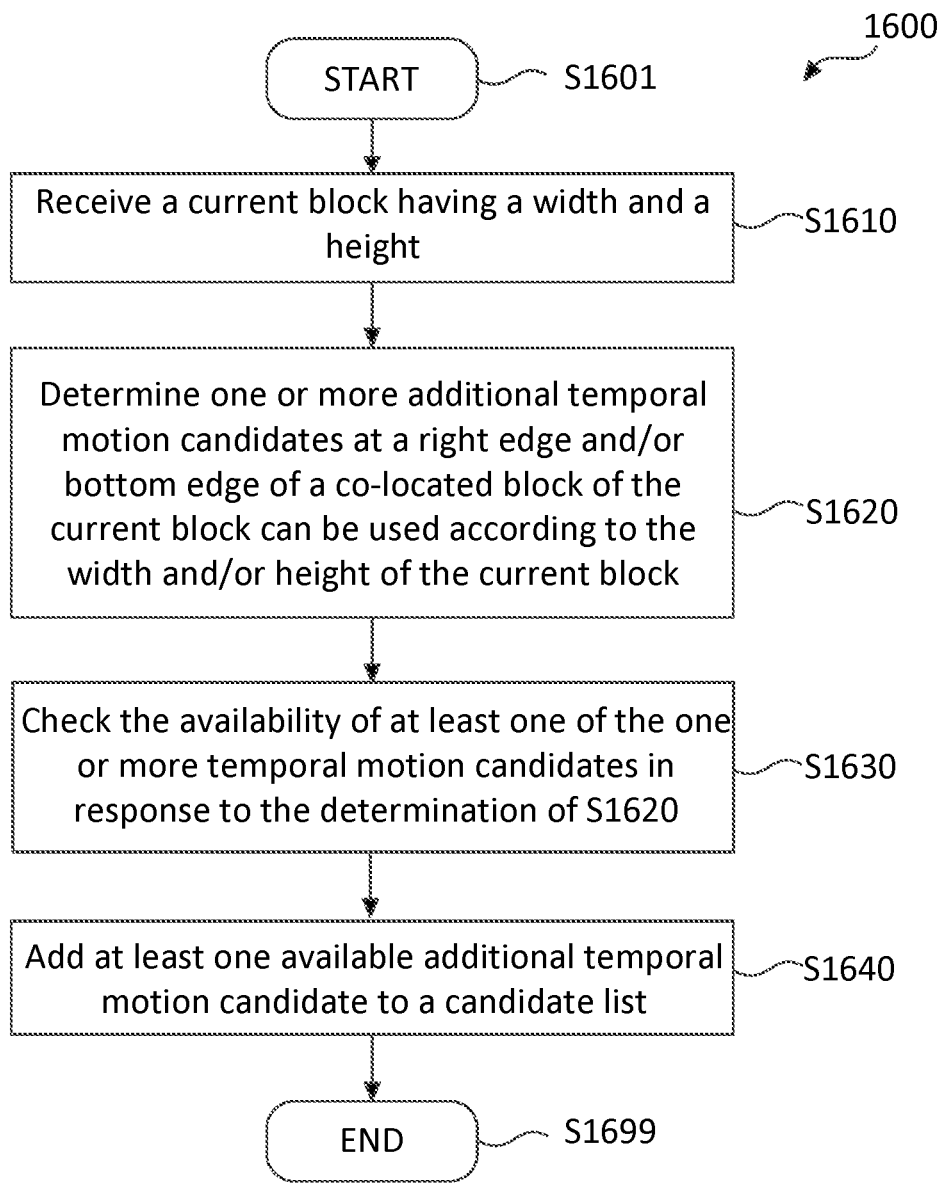
FIG. 16 shows a candidate list construction process according to embodiments of the disclosure.

IV. Examples of a Candidate List Construction Process Based on Additional Temporal Motion Candidates FIG. 16 shows a flowchart of a candidate list construction process (1600) according to some embodiments of the disclosure. The candidate list construction process (1600) can be performed to construct a merge candidate list in merge mode or a MV predictor candidate list in AMVP mode. The process (1600) can utilize additional temporal motion candidates at a right edge or bottom edge of a co-located block. The process (1600) can be performed at an encoder or a decoder as described with reference to FIGS. 2-7. The process (1600) starts from (S1601) and proceeds to (S1610).

At (S1610), a current block is received. For example, a current picture or a current picture region (e.g., slice) is partitioned into coding blocks (e.g., prediction blocks). The current block is one of such coding blocks. The current block can have a rectangular shape, and thus include an array of samples and has a width and a height.

At (S1620), a determination is made as to whether one or more additional temporal motion candidates can be used. The determination is made according to a size (i.e., the width and/or the height) of the current block. For example, as described above, the width and height of the current block is compared to one or more thresholds. Further, as described above, the one or more temporal motion candidates can be located at a right edge and/or bottom edge of a co-located block of the current block. For example, the one or more additional temporal motion candidates can include an additional temporal motion candidate located at the positions C2, or C3 as described herein, or can be one of multiple temporal candidates, $C_{Rj}$ or $C_{Bk}$, as described herein.

Step (S1620) can be part of a merge mode process or an AMVP mode process. In one embodiment, (S1620) is performed when availability of at least one temporal motion candidate is to be checked for inclusion in the candidate list. In the merge mode, the merge candidate list can include at least one temporal motion candidate for example. Similarly, in the AMVP mode the MV predictor candidate list can include at least one temporal motion candidate when the number of spatial candidates included in the MV predictor candidate list is, for example, less than 2. During the merge or AMVP process, spatial as well as temporal motion candidates at predefined candidate positions as described herein can be checked to construct a merge or MV predictor candidate list. In various examples, when the width, the height, or both, of the current block is greater than one or more respective thresholds, respective additional motion candidates may be checked. Otherwise, no additional temporal motion candidate is checked.

At (S1630), in response to a determination at (S1620) that one or more additional temporal motion candidates can be used, the availability of at least one of the one or more temporal motion candidates can be checked. For example, each of the one or more additional temporal motion candidates are checked until a sufficient number of available temporal motion candidates are determined to be available and can be added to the candidate list. The order in which the one or more additional temporal motion candidates is checked varies based on the embodiments described above. In the AMVP mode example described with reference to FIG. 8, when a number of available spatial motion candidates in the candidate list is less than 2, the at least one or more additional temporal motion candidate positions can be checked. In such a case, the steps of (S1620) and (S1630) can be successively performed. In contrast, when available spatial motion candidates in the candidate list are equal to 2, the additional temporal motion candidate positions will not be checked.

At (S1640), when at least one available additional temporal motion candidate is identified in the step of checking of the at least one of the one or more additional temporal motion candidates in (S1630), the at least one available additional temporal motion candidate is added to the merge or MV predictor candidate list. The number of the at least one available temporal motion candidate is less than or equal to the number of candidates to be added to the candidate list. Optionally, a pruning operation may be performed to prevent redundant motion candidates from being added to the candidate list. The process (1600) proceeds to (S1699) and terminates at (S1699).

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
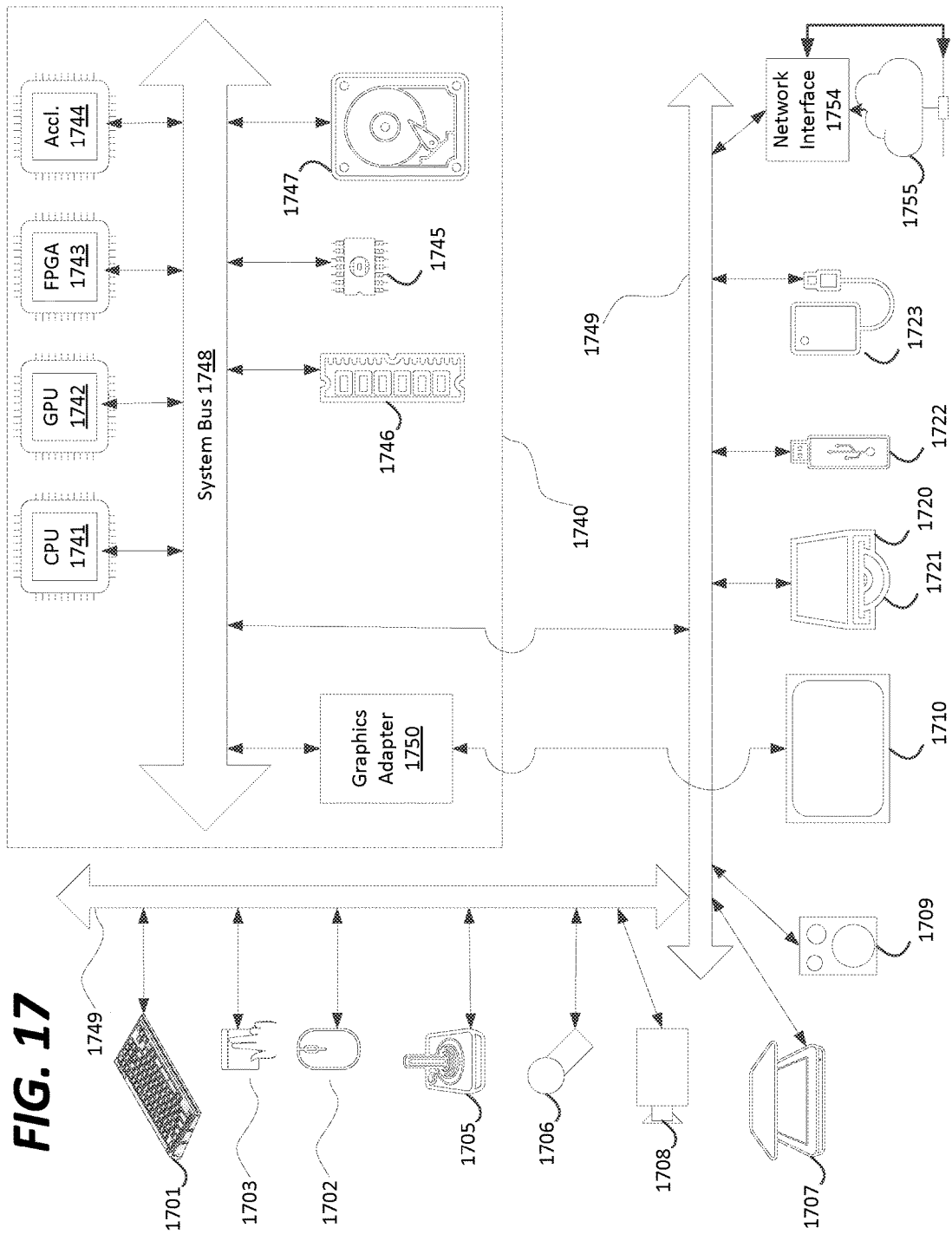
FIG. 17 is a schematic illustration of a computer system in accordance with an embodiment.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data can be also be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
MVF: Motion Vector Field.
MVP: Motion Vector Prediction.
AMVP: Advanced Motion Vector Prediction.

What is claimed is:

1. A method for video decoding, comprising:
   receiving a current block of a current picture, the current block having a width and a height;
   determining whether a first temporal motion candidate at one of a right edge and bottom edge of a co-located block of the current block can be used according to a comparison of the width of the current block with a first threshold and a comparison of the height of the current block with a second threshold;
   in response to determining that the first temporal motion candidate can be used, checking the availability of the first temporal motion candidate at the one of the right edge and bottom edge of the co-located block of the current block; and
   when the first temporal motion candidate is available, adding the first temporal motion candidate to a motion candidate list.

2. The method of claim 1, wherein the candidate list is one of a merge candidate list and a motion vector predictor candidate list.

3. The method of claim 1, wherein the first temporal motion candidate is at one of the middle of the right edge and the middle of the bottom edge of the co-located block.

4. The method of claim 1, wherein the checking the availability of the first temporal motion candidate comprises:
   when the height of the current block is larger than the first threshold, checking the availability of the first temporal motion candidate at the middle of the right edge of the co-located block, the first temporal motion candidate being located at one of locations above and below a middle point of the right edge of the co-located block.

5. The method of claim 1, wherein the checking the availability of the first temporal motion candidate comprises:
   when the width of the current block is larger than the second threshold, checking the availability of the first temporal motion candidate at the middle of the bottom edge of the co-located block, the first temporal motion candidate being located at one of the left and right side of a middle point of the bottom edge of the co-located block.

6. The method of claim 1, wherein the checking the availability of the first temporal motion candidate comprises:
   when the width of the current block is larger than the second threshold, and the height of the current block is smaller than the first threshold, checking the availability of the first temporal motion candidate at the middle of the bottom edge of the co-located block.

7. The method of claim 1, wherein the checking the availability of the first temporal motion candidate comprises:
   when the height of the current block is larger than the first threshold, and the width of the current block is smaller than the second threshold, checking the availability of the first temporal motion candidate at the middle of the right edge of the co-located block.

8. The method of claim 1, wherein, when the height of the current block is larger than the first threshold, and the width of the current block is larger than the second threshold, the checking the availability of the first temporal motion candidate includes checking the availability of the first temporal motion candidate at the middle of the bottom edge of the co-located block, and the method further includes checking the availability of a second temporal motion candidate at the middle of the right edge of the co-located block.

9. The method of claim 1, further comprising:

adding available temporal motion candidates to the motion candidate list according to one of:

(i) when the temporal motion candidates are available at temporal candidate positions C2, C3, and C0 where C2 represents a temporal candidate position at the middle of the bottom edge of the co-located block, C3 represents a temporal candidate position at the middle of the right edge of the co-located block, and C0 represents a temporal candidate position at the bottom-right corner of the co-located block, adding the available temporal motion candidates to the candidate list according to one of the following orders:

{C2, C3, C0},
{C3, C2, C0},
{C0, C2, C3},
{C0, C3, C2},
{C2, C0, C3}, or
{C3, C0, C2};

(ii) when the temporal motion candidates are available at temporal candidate positions C2, C3, and C1 where C1 represents a temporal candidate position at the center of the co-located block, adding the available temporal motion candidates to the candidate list according to one of the following orders:

{C2, C3, C1},
{C3, C2, C1},
{C1, C2, C3},
{C1, C3, C2},
{C2, C1, C3}, or
{C3, C1, C2};

(iii) when the temporal motion candidates are available at the temporal candidate positions C2 and C0, adding the available temporal motion candidates to the candidate list according to one of the following orders:

{C2, C0}, or
{C0, C2};

(iv) when the temporal motion candidates are available at the temporal candidate positions C3 and C0, adding the available temporal motion candidates to the candidate list according to one of the following orders:

{C3, C0}, or
{C0, C3};

(v) when the temporal motion candidates are available at the temporal candidate positions C2 and C1, adding the available temporal motion candidates to the candidate list according to one of the following orders:

{C2, C1}, or
{C1, C2}; or (vi) when the temporal motion candidates are available at the temporal candidate positions C3 and C1, adding the available temporal motion candidates to the candidate list according to one of the following orders:

{C3, C1}, or
{C1, C3}.

10. The method of claim 1, wherein the checking the availability of the first temporal motion candidate comprises:

checking availabilities of temporal motion candidates at the right edge of the co-located block, wherein starting from the bottom-right corner of the co-located block, every M samples from the right edge of the co-located block has one of the temporal motion candidates.

11. The method of claim 1, wherein the checking the availability of the first temporal motion candidate comprises:

checking availabilities of temporal motion candidates at the bottom edge of the co-located block, wherein starting from the bottom-right corner of the co-located block, every N samples from the bottom edge of the co-located block has one of the temporal motion candidates.

12. An apparatus for video decoding, comprising circuitry configured to:

receive a current block of a current picture, the current block having a width and a height;

determine whether a first temporal motion candidate at one of a right edge and bottom edge of a co-located block of the current block can be used according to a comparison of the width of the current block with a first threshold and a comparison of the height of the current block with a second threshold;

in response to a determination that the first temporal motion candidate can be used, check the availability of the first temporal motion candidate at the one of the right edge and bottom edge of the co-located block of the current block; and when the first temporal motion candidate is available, add the first temporal motion candidate to a motion candidate list.

13. The apparatus of claim 12, wherein the candidate list is one of a merge candidate list and a motion vector predictor candidate list.

14. The apparatus of claim 12, wherein the first temporal motion candidate is at one of the middle of the right edge and the middle of the bottom edge of the co-located block.

15. The apparatus of claim 12, wherein the circuitry is further configured to:

when the height of the current block is larger than the first threshold, check the availability of the first temporal motion candidate at the middle of the right edge of the co-located block, the first temporal motion candidate being located at one of locations above and below a middle point of the right edge of the co-located block.

16. The apparatus of claim 12, wherein the circuitry is further configured to:

when the width of the current block is larger than the second threshold, check the availability of the first temporal motion candidate at the middle of the bottom edge of the co-located block, the first temporal motion candidate being located at one of the left and right side of a middle point of the bottom edge of the co-located block.

17. The apparatus of claim 12, wherein the circuitry is further configured to:

check availabilities of temporal motion candidates at the right edge of the co-located block, wherein starting from the bottom-right corner of the co-located block, every M samples from the right edge of the co-located block has one of the temporal motion candidates.

18. The apparatus of claim 12, wherein the circuitry is further configured to:

check availabilities of temporal motion candidates at the bottom edge of the co-located block, wherein starting from the bottom-right corner of the co-located block, every N samples from the bottom edge of the co-located block has one of the temporal motion candidates.

19. A non-transitory computer-readable medium storing instructions that, when executed by a computer for video decoding, cause the computer to perform a method for video decoding, the method comprising:
- receiving a current block of a current picture, the current block having a width and a height;
- determining whether a first temporal motion candidate at one of a right edge and bottom edge of a co-located block of the current block can be used according to a comparison of the width of the current block with a first threshold and a comparison of the height of the current block with a second threshold;
- in response to determining that the first temporal motion candidate can be used, checking the availability of the first temporal motion candidate at the one of the right edge and bottom edge of the co-located block of the current block; and
- when the first temporal motion candidate is available, adding the first temporal motion candidate to a motion candidate list.

20. The non-transitory computer-readable medium of claim 19, wherein the candidate list is one of a merge candidate list and a motion vector predictor candidate list.

* * * * *